United States Patent
Becker et al.

(10) Patent No.: US 7,177,303 B2
(45) Date of Patent: Feb. 13, 2007

(54) METHOD FOR TRANSMITTING A MESSAGE AND TELECOMMUNICATION SYSTEM

(75) Inventors: Thomas Becker, Arnsberg (DE); Joerg Bruchertseifer, Augsburg (DE); Guido Heling, Dortmund (DE); Logt Marco, Goch (DE); Helmut Lucassen, Stadtlohn (DE); Joern Watzke, Moosburg (DE)

(73) Assignee: Siemens Aktiengesellschaft, Munich (DE)

( * ) Notice: Subject to any disclaimer, the term of this patent is extended or adjusted under 35 U.S.C. 154(b) by 1043 days.

(21) Appl. No.: 10/182,959

(22) PCT Filed: Jan. 17, 2001

(86) PCT No.: PCT/EP01/00502

§ 371 (c)(1),
(2), (4) Date: Sep. 27, 2002

(87) PCT Pub. No.: WO01/58185

PCT Pub. Date: Aug. 9, 2001

(65) Prior Publication Data

US 2003/0078060 A1    Apr. 24, 2003

(30) Foreign Application Priority Data

Feb. 2, 2000   (EP)   ................... 00102074

(51) Int. Cl.
*H04L 12/66* (2006.01)
(52) U.S. Cl. .................... 370/355; 370/469
(58) Field of Classification Search ........ 370/352–358, 370/389, 355, 395.5, 386, 469, 395.21
See application file for complete search history.

(56) References Cited

U.S. PATENT DOCUMENTS

| | | | |
|---|---|---|---|
| 5,815,506 A | 9/1998 | Gokhale | |
| 6,163,546 A * | 12/2000 | Sipila | 370/466 |
| 6,188,909 B1 * | 2/2001 | Alanara et al. | 455/466 |
| 6,292,668 B1 * | 9/2001 | Alanara et al. | 455/466 |
| 6,351,522 B1 * | 2/2002 | Vitikainen | 379/67.1 |
| 6,961,330 B1 * | 11/2005 | Cattan et al. | 370/352 |

FOREIGN PATENT DOCUMENTS

| | | |
|---|---|---|
| GB | 2 298 339 | 8/1996 |
| WO | WO 99/49644 | 9/1999 |

\* cited by examiner

*Primary Examiner*—Brenda Pham
(74) *Attorney, Agent, or Firm*—Bell, Boyd & Lloyd LLP

(57) ABSTRACT

A method and telecommunication system are provided which enable the transmission of short messages according to the SMS model in a line-connected network.

7 Claims, 4 Drawing Sheets

FIG 5

| Information element | Reference | Presence | Format | Length |
|---|---|---|---|---|
| Protocol discriminator | TS GSM 04.07 | M | V | 1/2 octet |
| Transaction identifier | TS GSM 04.07 | M | V | 1/2 octet |
| Message type | | M | V | 1 octet |

FIG 6

| Mark Signal | Message Type | Message Lenght | CM Layer Message CP ... | Checksum |
|---|---|---|---|---|

METHOD FOR TRANSMITTING A MESSAGE AND TELECOMMUNICATION SYSTEM

BACKGROUND OF THE INVENTION

The present invention relates to a method for transmitting a message from a first to a second telecommunication terminal, of which at least one is connected to a line-connected telephone network, and a telecommunication system for carrying out this method.

In mobile radio networks operating according to the GSM standard, communication via short messages on the basis of the standard provided therefor has become successfully established in addition to the (of course, far dominant) voice communication; in particular, with regard to considerable cost advantages. In addition to the cost advantages, message transmission by SMS (short message service) also has utility value advantages in specific applications. Thus, reception and sending of an SMS can be achieved without an acoustic annoyance for the environment, and the transmission of short messages also affords additional expression and psychological articulation possibilities compared with voice communication.

SMS is a point-to-point short message service which is achieved in the context of the GSM protocol architecture at the signaling level. It includes the transport of packet-oriented useful data from and to mobile stations. The short messages are always transported via a short message service center (SM SC) in store-and-forward operation. The service center accepts the short messages, which are not more than 160 characters long, from a mobile station as telecommunication terminal and forwards them to a second telecommunication terminal, a further mobile station or else a fax unit or the like.

The GSM standard defines a specific protocol architecture for achieving this service. This architecture is defined in the ETSI specifications and is adequately described in the literature (cf. for instance, J. Eberspächer, H. J. Vögel: "GSM Global System for mobile communication", Stuttgart, 1997), so that a more detailed description can be dispensed with here and reference may be made to the appended list of standards/documents.

In the existing public line-connected telephone networks, such a transmission of short messages between normal telecommunication terminals (e.g. telephones) is not possible at the present time.

The present invention is, therefore, directed toward a method and a telecommunication system which enable the transmission of short messages according to the SMS model in a line-connected telephone network (fixed network).

SUMMARY OF THE INVENTION

Accordingly, the present invention includes the fundamental concept that, without consideration of the profound system differences between mobile radio networks, on the one hand, and the known line-connected networks (fixed networks), on the other hand, the tried and tested SMS protocol architecture of the GSM standard (or else a comparable architecture of the UMTS standard) is to an extent mapped onto the fixed network and expanded.

With the specifications described below, the present invention defines the transmission protocol and the physical and administrative preconditions for the transmission of short messages in the short message (SMS) format between the terminal and the short message service center. In this case, the transmission protocol is preferably defined in close accord with the protocol defined in the GSM standard. This pursues the aim of offering the transmission of short messages as a new service for the fixed network with little outlay and high compatibility with existing systems. A uniform SMS format is used in the GSM network and in the fixed network, thereby ensuring the smooth transmission of short messages between a mobile radio network that is set up and operated according to the GSM standard and the fixed network equipped according to the present invention. Moreover, the path taken by this embodiment of the present invention affords the considerable practical advantage that, in the specification of the SMS service, it is possible to have recourse to the greatest possible extent to the recognized, tried and tested GSM specifications that have proved reliable in the meantime.

In the physical layer, the data transmission between terminal and service center is effected via DTMF signaling and/or via an FSK (frequency shift keying) off-hook signaling specified according to ETS 300 659-1 and ETS 300 659-2. These aforementioned transmission methods can be used in any desired combinations. In particular, the terminal can perform signaling via DTMF and the service center can utilize FSK modulation, in which case, of course, the respective receiving unit must be adapted for the method employed.

Above the physical layer, a data link layer is specified which ensures the logical connection setup and the fitting to the GSM-SMS standard. The latter standard is defined, in particular, in the ETSI documents GSM04.07 (ETS 300 556), GSM04.11 and GSM03.40. In compatibility therewith, the data link layer can be freely defined in adaptation to the concrete requirements.

In accordance with one advantageous embodiment of the present invention, the newly defined physical layer and data link layer are combined with the existing layers of the GSM-SMS protocol set. This involves the short message transfer layer (SM-TL) in accordance with ETSI document GSM03.40, the short message relay layer (SM-RL) according to GSM03.40 and 04.11 and also the connection management layer (CM) according to GSM04.11.

The last-mentioned layer CM specifically defines an additional message for the signaling of the connection state (CP-Connect), whose format is determined according to GSM04.07/chapter 11. There is also a specific definition with regard to the format of a message in the data link layer (DL). This will be discussed in more detail further below.

In a preferred embodiment of the present invention, as already indicated further above, one of the telecommunication terminals is connected to a mobile radio network that is operated according to the GSM standard or else the future UMTS standard, the connection between the two networks being established in a customary manner by a gateway mobile switching center.

A further advantageous embodiment of the present invention results if at least one of the telecommunication terminals is a cordless telephone from which or to which the short message is transmitted into or from the fixed network via a fixed station or private branch exchange operated according to the DECT standard. Modern cordless telephones are provided with the most important hardware preconditions for implementing the proposed service; in particular, they are generally equipped with a suitable display unit and parts for DTMF signaling and are designed for identifying the abovementioned FSK off-hook signaling.

Additional features and advantages of the present invention are described in, and will be apparent from, the following Detailed Description of the Invention and the Figures.

BRIEF DESCRIPTION OF THE FIGURES

FIG. 5 shows an illustration of the setup of a message for the start of the procedure on the connection management layer.

FIG. 6 shows an illustration of the message format on the data link layer.

DETAILED DESCRIPTION OF THE INVENTION

Figure 1:
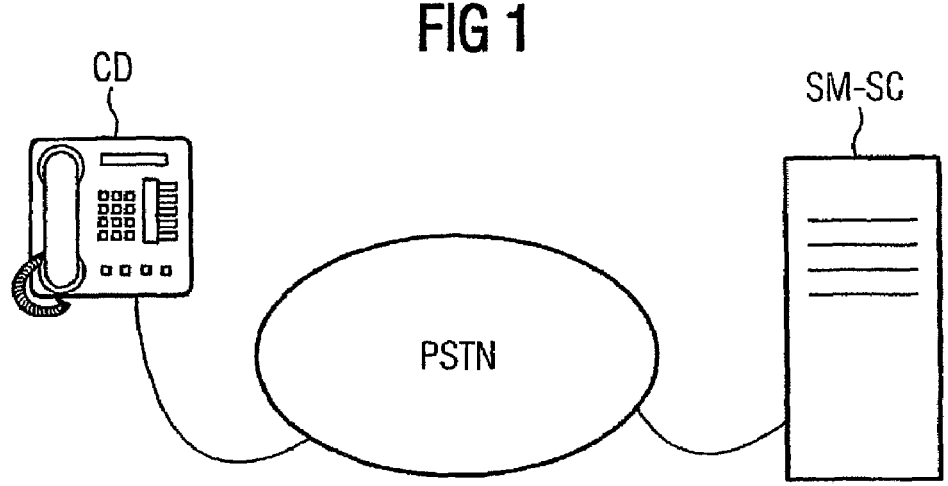
FIG. 1 shows a schematic sketch of a telecommunication system according to the present invention.

FIG. 1 schematically shows the basic components of a telecommunication system according to the present invention; namely, a public line-connected telephone network (fixed network) PSTN, a telecommunication terminal CD connected to the latter, and a short message service center SM SC likewise connected to the fixed network. The following explanations for elucidating the present invention relate to the interaction of these components.

Figure 2:
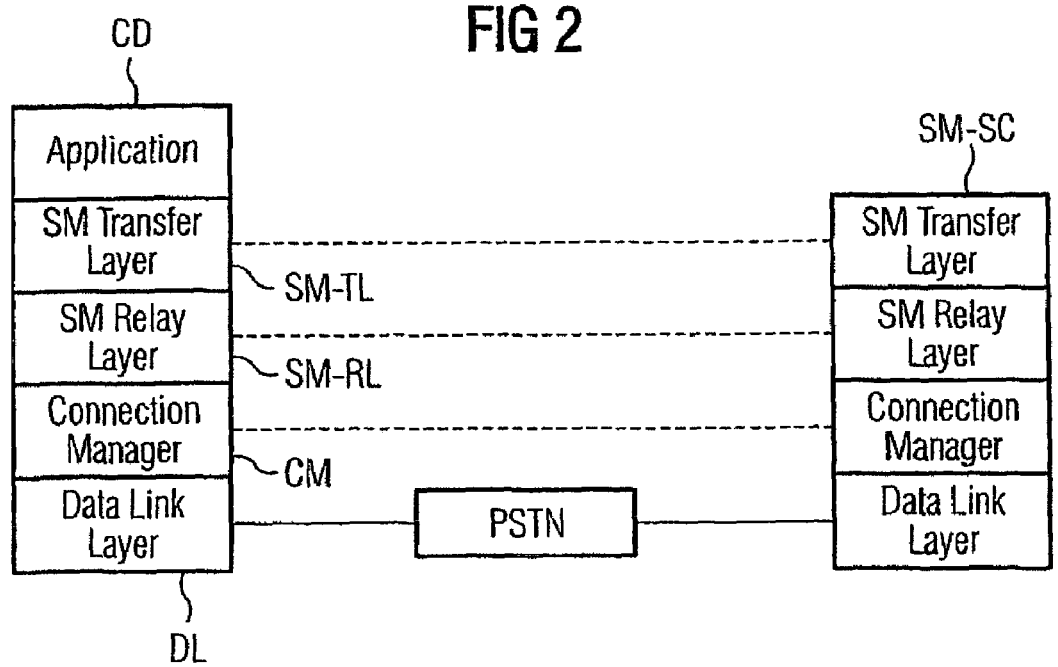
FIG. 2 shows an illustration of the layer model (SI model) of the configuration according to FIG. 1.

FIG. 2 shows the associated SI layer model, above the physical layer (not illustrated here). The layer structure includes firstly a data link layer DL, specified in more detail further below, and furthermore the layers known per se from the GSM-SMS standard, connection manager CM, short message relay layer SM-RL and short message transfer layer SM-TL and also, on the part of the terminal, application.

The protocol descriptions of the layers SM-TL, SM-RL and CM can be gathered from the ETSI documents GSM03.40 [1] and GSM04.11 [3]; in this respect, see the enclosed list of standards/documents.

The basic precondition for the transmission of short messages via the fixed network PSTN is a circuit switching between the participating units (telecommunication terminals and short message service center). It is then unimportant whether the units are connected via ISDN or an analog interface.

Figure 3:
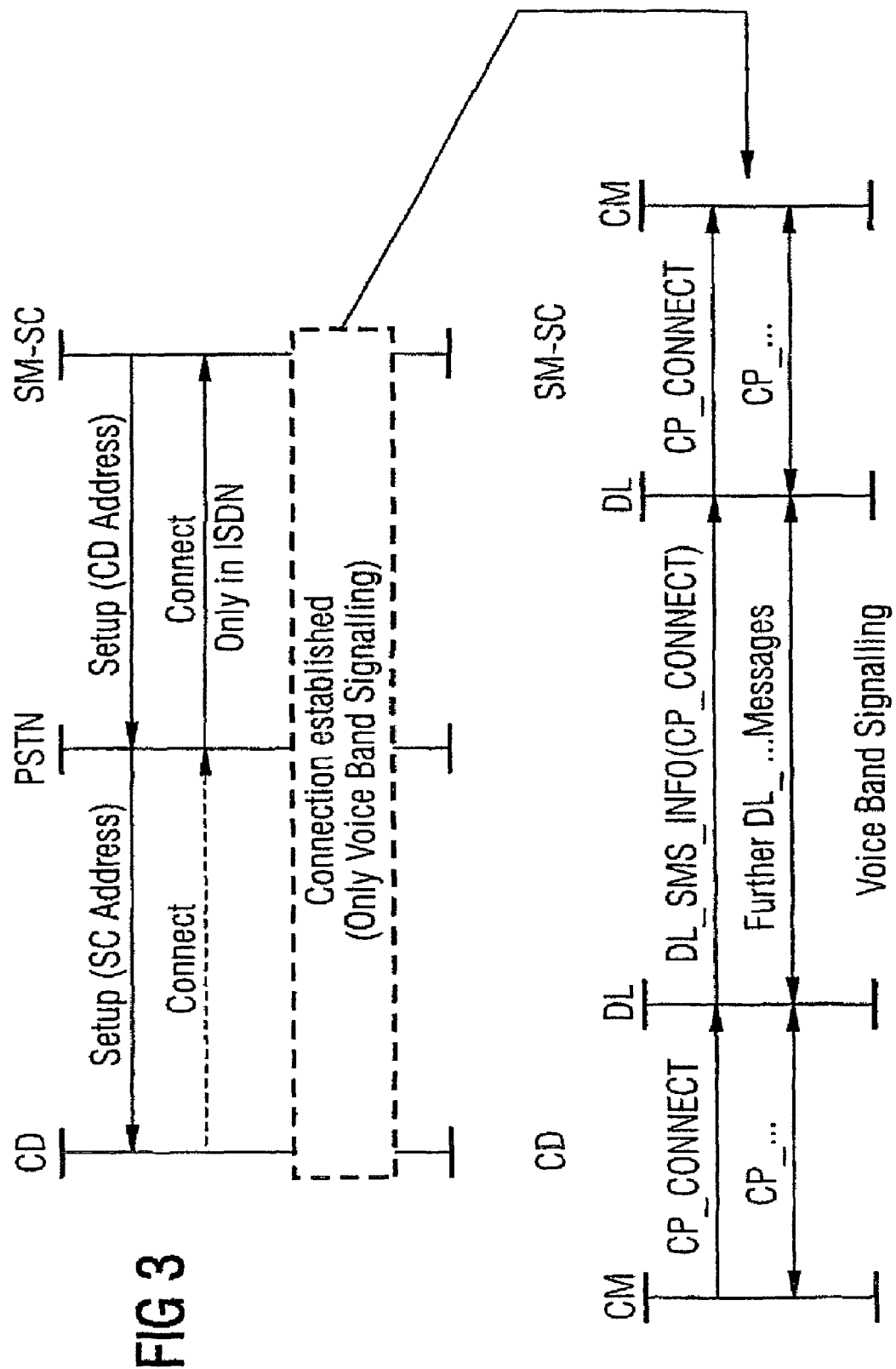
FIG. 3 shows a flow diagram for a connection setup initiated by the telecommunication terminal in accordance with one embodiment of the present invention.
Figure 4:
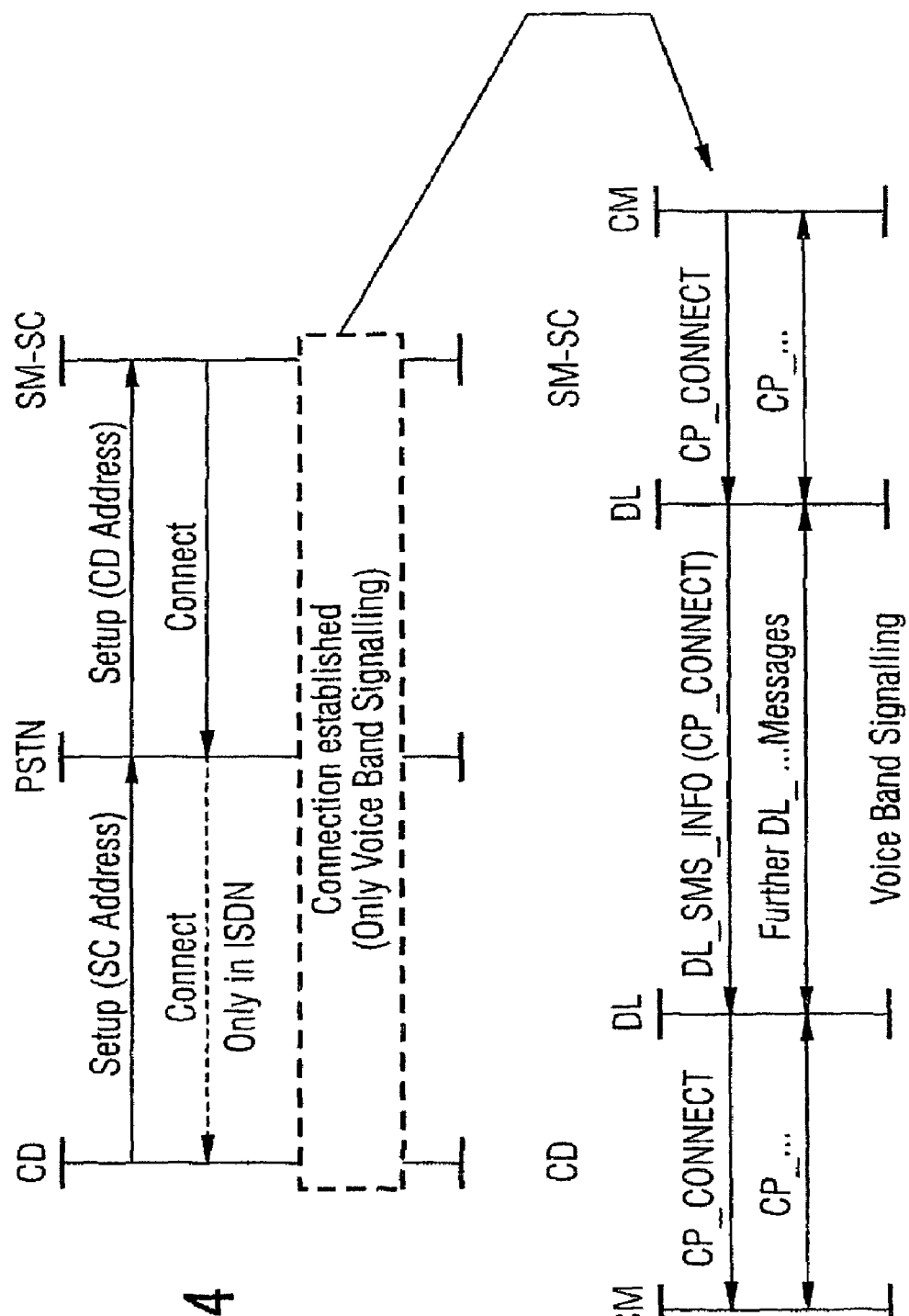
FIG. 4 shows a flow diagram for a connection setup initiated by the short message service center in accordance with one embodiment of the present invention.

FIGS. 3 and 4 schematically illustrate the setup of a connection proceeding from a telecommunication terminal (FIG. 3) or proceeding from the short message service center (FIG. 4). These diagrams are self-explanatory for the person skilled in the art and therefore require no further explanation here.

In the case of an ISDN network, the messages are of functional type and are transmitted in the ISDN-D channel. Ringing pulses and busy signals are involved in the case of an analog network. After the setup of the connection, all the information items are transmitted between the units by FSK signaling in the voice band; specifically, in accordance with the ETSI specifications ETS 300 659-1 [4] and ETS 300 659-2 [5].

FIG. 5 shows the setup of an additional message CP CONNECT, which serves for enabling the called unit to notify the calling unit of the setup of the connection. This notification is necessary in order to initiate the sequences in the CM layer. The message type coding is: 0x40 0100 0000B, and the format follows GSM04.7/chapter 11 [2].

The layer DL enables the connection manager (layer CM) to send and receive messages with the partner unit, it provides the bit error detection and effects a mark signal for a message in the layer CM.

FIG. 6 illustrates the format of a message in the data link layer. The field "mark signal" includes a block of 80±25 bits. The field "message type" includes one octet and contains a binary coded identification code number for the message. The coding for a DL_SMS_INFO message type is: 011H 0001 0001B. The coding for a DL_SMS_ERROR message type is: 012H 0001 0010 B.

The field "message length" includes one octet and contains the binary coded number of octets of the message (with the exception of the octets of the message type, the message length and the checksum). Overall, a message length of up to 255 octets is allowed. The field "checksum" includes one octet and contains the two compliments of the sum of all the octets in the message, starting from the "message type" octet to the end, modulo 256.

In the case of a checksum error, the data link layer of the receiving unit sends a message of the type "DL_SMS_ERROR" to the (originally) sending unit. In this message, the data field is empty and the message length is set to zero. The data link layer of the sending unit must thereupon repeat the last message sent.

With regard to the physical layer, it also should be noted that a half-duplex 1200 baud modulation can be used in the case of FSK signaling. In the case of DTMF signaling, each octet of a message is divided, in the data link layer, into the higher (upper) and lower nibble. Each nibble is coded with a DTMF bit. The upper nibble is sent first and then the lower nibble. In the case of DTMF signaling, the mark signal of the DL message is omitted.

There are diverse combination possibilities with regard to the signaling method; in the normal case, a selection is fixedly installed in the telecommunication terminal, which selection can then no longer be altered by the user.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for transmitting a message from a first to a second telecommunication terminal, of which at least one of the first and the second telecommunication terminal is connected to a line-connected telephone network with DTMF signaling, the method comprising the steps of:

mapping onto the line-connected network and expanding at least one of an SMS protocol architecture of a GSM standard and a comparable architecture of a UMTS standard;

inputting the message as a short message, via one of an input keypad and a touchscreen, on the first telecommunication terminal;

converting the short message into a short message format;

establishing a logical connection setup via an adequately specified data link layer, combined with a short message transfer layer, a short message relay layer, and a connection management layer;

transmitting the short message in the short message format in an adequately specified physical layer via one of DTMF and FSK off-hook signaling to a short message service center and from the short message service center to the second telecommunication terminal;

converting, in the second telecommunication terminal, the short message obtained from the short message service center, into an output format; and outputting the short message in the output format on a display unit.

2. A telecommunication system for transmitting a message from a first to a second telecommunication terminal, comprising:

a first and a second telecommunication terminal;

a line-connected telephone network with DTMF signaling, wherein at least one of the first and the second telecommunication terminals is connected to the line-connected telephone network; and an SMS transmission protocol in which a data link layer is specifically defined and combined with a short message transfer layer, a short message relay layer and a connection management layer, and in which a physical layer is specifically defined;

wherein at least one of the SMS protocol architecture of a GSM standard and a comparable architecture of UMTS standard is mapped onto the line-connected telephone network and expanded, the message is input as a short message via one of an input keypad and a touch screen on the first telecommunication terminal, the short message is converted into a short message format, a logical connection set-up is established via the data link layer combined with the short message transfer layer, the short message relay layer and the connection management layer, the short message is transmitted in the short message format in the physical layer via one of DTMF and FSK off-hook signaling to a short message service center and from the short message service center to the second telecommunication terminal, and the short message obtained from the short message service center is converted, in the second telecommunication terminal, into an output format and is output on a display unit.

3. A telecommunications system as claimed in claim 2, wherein one of the first and second telecommunication terminals is connected to a mobile radio network operated according to one of the GSM and the UMTS standard, with the line-connected telephone network being connected to the mobile radio network via a gateway mobile switching center.

4. A telecommunication system as claimed in claim 2, wherein one of the first and the second telecommunication terminals is a cordless telephone connected to the line-connected telephone network via one of a fixed station and a private branch exchange operated according to a DECT standard.

5. A telecommunications system as claimed in claim 2, wherein an additional message for specific signaling of a connection state to a calling unit in a format according to GSM04.07/chapter 11 is defined in the connection management layer.

6. A telecommunication system as claimed in claim 2, wherein a format of a message in the data link layer is defined, in order, as a field "mark signal", a field "message type", a field "message link", a field "CM layer message CP_ . . . ", and a field "checksum".

7. A telecommunication system as claimed in claim 2, wherein a short message service center is assigned to the line-connected telephone network for transmitting short messages in the short message format.

* * * * *